(12) United States Patent
Liu

(10) Patent No.: US 8,709,219 B2
(45) Date of Patent: Apr. 29, 2014

(54) STRUCTURED DIAMOND TOOL MADE BY FOCUSED ION BEAM NANOMACHINING

(75) Inventor: Xinbing Liu, Acton, MA (US)

(73) Assignee: Panasonic Corporation, Osaka (JP)

( * ) Notice: Subject to any disclaimer, the term of this patent is extended or adjusted under 35 U.S.C. 154(b) by 1789 days.

(21) Appl. No.: 11/884,852

(22) PCT Filed: Mar. 6, 2006

(86) PCT No.: PCT/US2006/004553
§ 371 (c)(1),
(2), (4) Date: Aug. 22, 2007

(87) PCT Pub. No.: WO2006/098828
PCT Pub. Date: Sep. 21, 2006

(65) Prior Publication Data
US 2008/0149474 A1  Jun. 26, 2008

Related U.S. Application Data

(60) Provisional application No. 60/660,522, filed on Mar. 10, 2005.

(51) Int. Cl.
*C23C 14/34* (2006.01)

(52) U.S. Cl.
USPC .................. 204/192.35; 204/192.32

(58) Field of Classification Search
USPC .......................... 204/192.32, 192.34, 192.35
See application file for complete search history.

(56) References Cited

U.S. PATENT DOCUMENTS

| | | | |
|---|---|---|---|
| 5,152,060 A | 10/1992 | Schubert et al. | |
| 5,916,424 A * | 6/1999 | Libby et al. | 204/298.36 |
| 6,353,204 B1 | 3/2002 | Spaay et al. | |
| 6,638,667 B2 * | 10/2003 | Suleski et al. | 430/5 |
| 2003/0223830 A1 * | 12/2003 | Bryan et al. | 407/119 |
| 2004/0190152 A1 | 9/2004 | Hayashi | |
| 2004/0217496 A1 | 11/2004 | Matsuda et al. | |

* cited by examiner

*Primary Examiner* — Rodney McDonald
(74) *Attorney, Agent, or Firm* — Harness, Dickey & Pierce, P.L.C.

(57) ABSTRACT

A structured diamond tool having a predefined grayscale grating profile shape allows a corresponding grayscale grating profile to be machined into a work piece with a single pass with high accuracy. Manufacture of grayscale gratings using this technique saves time compared to the situation where the profile is machined by a single-point diamond tool with multiple passes. Also, more time-saving is realized if more than one period is machined in the diamond tool. Such a tool can be manufactured using a high precision focused ion beam (FIB), which is a true nanomachining tool that can machine features on the order of tens of nanometers. The diamond tool made by FIB therefore has extremely fine resolution and features required by the grayscale grating.

2 Claims, 7 Drawing Sheets

STRUCTURED DIAMOND TOOL MADE BY FOCUSED ION BEAM NANOMACHINING

FIELD OF THE INVENTION

The present invention generally relates to manufacture of grayscale gratings, and relates in particular to a structured diamond tool having a grayscale grating profile shape formed by a high intensity focused ion beam.

BACKGROUND OF THE INVENTION

Optical pickups in CD, DVD, and newer BD drives have gratings (called holographic optical elements, HOES) in them to diffract the laser beam for various purposes, such as focus tracking and signal detection. The gratings can be straight to diffract an incident beam into several orders, or curved to have additional functions other than splitting the beams, such as focusing the beams to the detectors.

One way of mass producing the gratings is to make a mold first, and manufacture the gratings by press molding. For binary gratings, photolithographic processes have been used to make the grating molds. However, as the grating design evolves from binary to grayscale (blazed), and the grating period becomes smaller for shorter wavelengths, photolithographic processes become less suitable for producing the required grating molds.

It is known that single point diamond turning can be used to machine gratings and grating molds. In the known process, the diamond tool has a single sharp tip. The diamond tool makes one or more ruling passes within one period to remove material to fabricate the grating or grating mold. This process works well for simple grating shapes.

Advanced grating designs for optical pickup can require more complicated grating profiles within one period to achieve desired functions of the grating. As an example, a particular design for an optical pickup grating has the following shape shown in FIG. 1. Such gratings have fine, micrometer- to sub-micrometer-size features that are difficult to machine with a simple, single-point diamond tool. What is needed is a way to make structured diamond tools that can machine gratings or grating molds with complicated shapes. The present invention fulfills this need.

SUMMARY OF THE INVENTION

In accordance with the present invention, a structured diamond tool having a predefined grayscale grating profile shape allows a corresponding grayscale profile to be machined into a work piece with a single pass with high accuracy. Manufacture of grayscale gratings using such a structured diamond tool saves time compared to the situation where the profile is machined by a single-point diamond tool with multiple passes. Also, more time-saving is realized if more than one period is machined in the diamond tool. Such a tool is manufactured using a high precision focused ion beam (FIB), which is a true nanomachining tool that can machine features on the order of tens of nanometers. The diamond tool made by FIB therefore has extremely fine resolution and features required by the grayscale grating.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
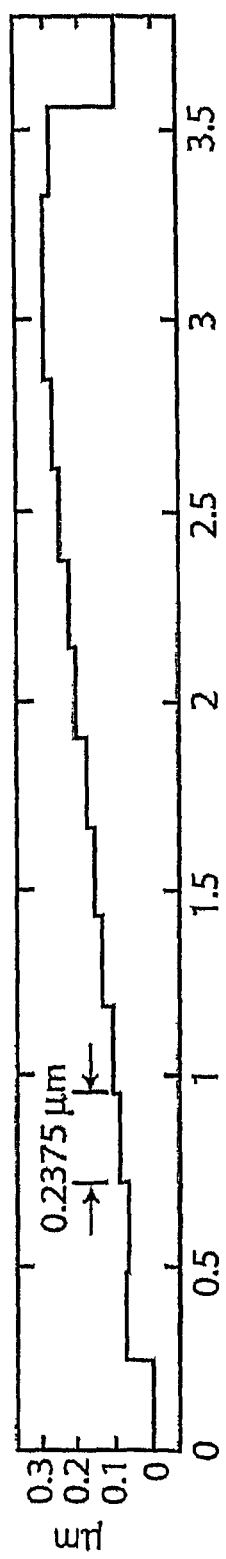
FIG. 1 is a two-dimensional graph illustrating a grayscale grating profile in accordance with the present invention, wherein the abscissa and ordinate axes are both in micrometer units.

The present invention uses high precision focused ion beam (FIB) nanomachining to machine the profile of at least one period of the grating in the tip of a diamond tool. FIG. 1 illustrates one period of an example grayscale grating profile. It has individual features less than one-tenth of a micrometer high and less than one quarter micrometers wide. A single period composed of such features can be three-tenths of a micrometer or less in height, and less than four micrometers wide. Accordingly, a predefined grayscale grating profile machined into a tip of the diamond tool bears features on an order of tens of nanometers.

If the diamond tool is used to machine the grating directly, then the negative of the grating profile shape is made into the diamond tool. If the diamond tool is used to machine the grating mold, then the normal grating shape is made into the diamond tool. In diamond machining, the structured diamond tool cuts into the substrate material (either the grating material itself or the mold material) with a depth at least the maximum depth of the designed grating shape. The diamond tool is ruled along the grating groove. For the structured diamond tool that has n (n≥1) periods of the grating profiles, n grooves are made after each ruling along the groove. The diamond tool is then stepped n periods in the direction perpendicular to the grating groove, and the machining process is repeated.

Figure 2A:
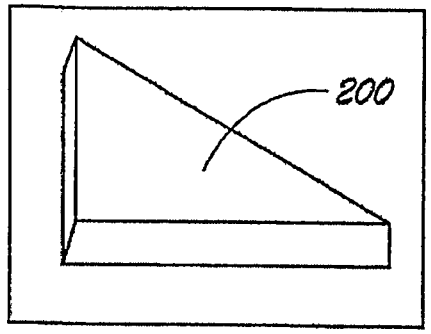
FIG. 2 is a set of views illustrating viewing of a tip of a diamond tool, including a three-dimensional overview in FIG. 2A, a magnified top view in FIG. 2B, and a top view of the diamond tool tip as viewed in a view mode of an FIB machine at zero degrees tilt and twenty-five thousand times magnification, with a scale bar at five micrometers.
Figure 2B:
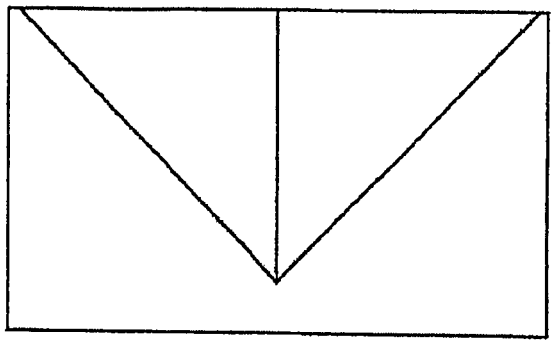
Figure 2C:
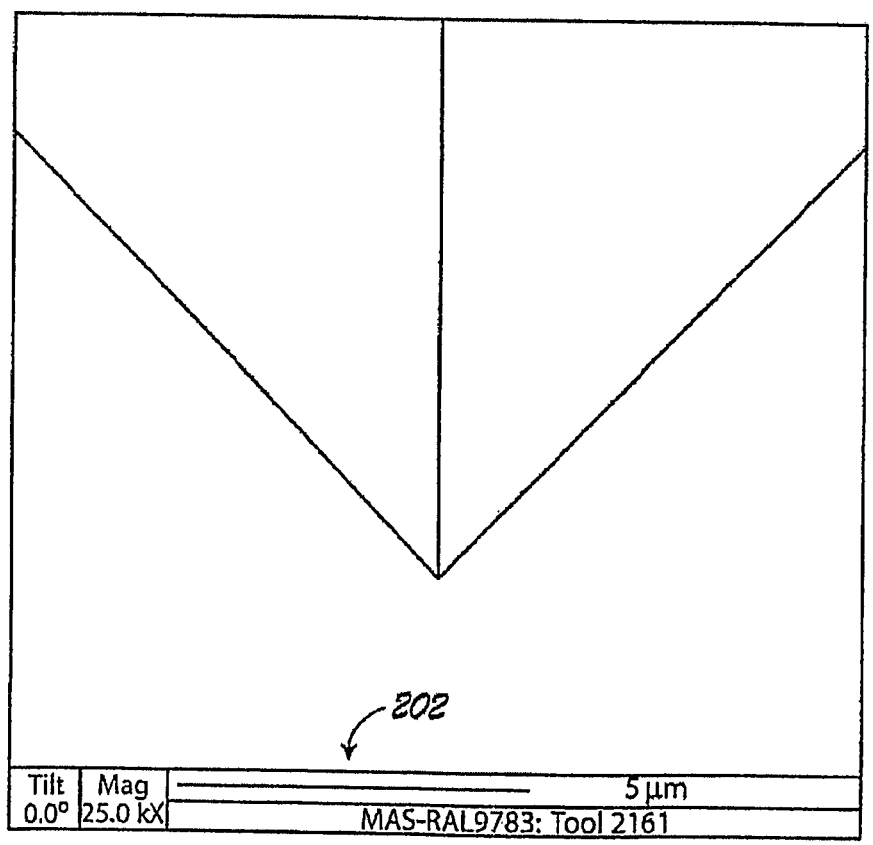

The process of FIB nanomachining of a structured diamond tool proceeds as follows. Start with a single point diamond tool, as shown is FIG. 2(a) (3D view) and FIG. 2B (top view). Place the diamond tool in an FIB machine. Using the FIB machine's view mode (low current), the diamond tip is viewed by the operator, as shown in FIG. 2C (top view). The FIB machine's ion beam comes into the view; that is, it strikes the image shown in FIG. 2C in the normal direction with respect to a plane of the image. In other words, the ion beam is orthogonal to a plane in which lies a top surface 200 (FIG. 2A) of the diamond tip. The FIB magnification is calibrated so that the correct size of the diamond tool is shown in the image, as the size bar 202 in the lower part in FIG. 2C indicates.

Figure 3:
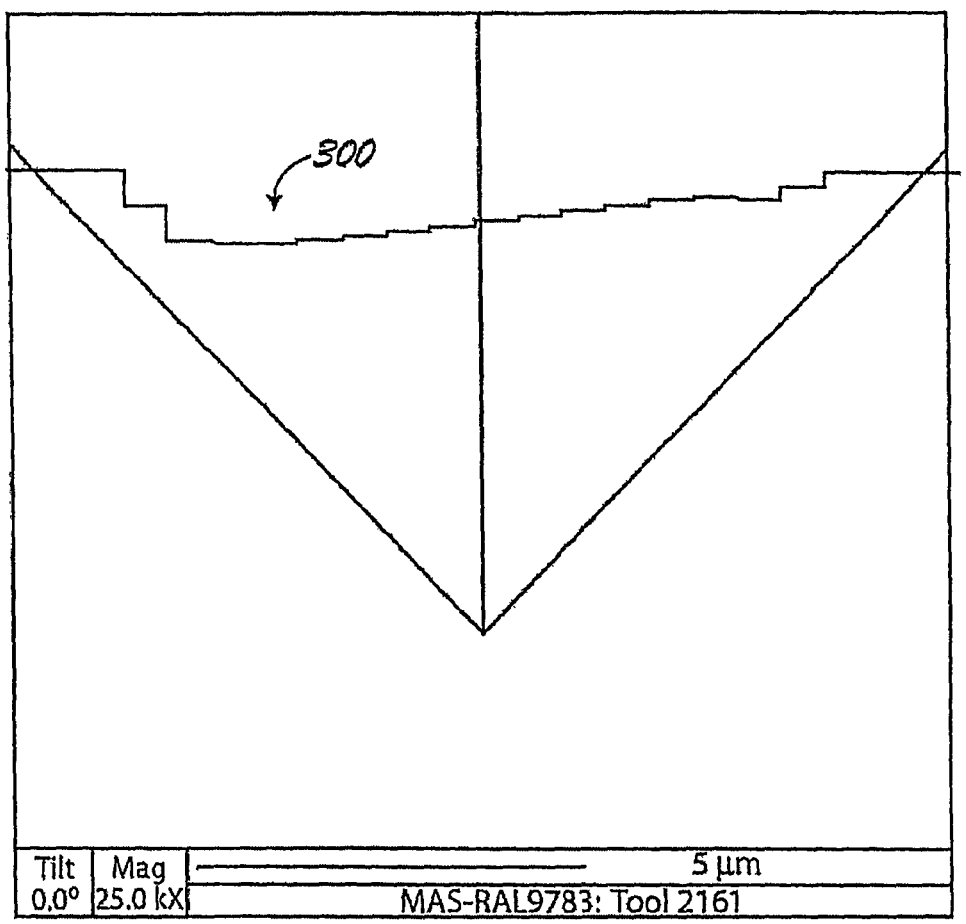
FIG. 3 is a view illustrating a predefined grayscale grating profile shape overlaying the magnified FIB image of FIG. 2C in accordance with the present invention.

Using the FIB machine drawing software, overlay the grating profile 300 to be made over the image of the diamond tip, as shown in FIG. 3. The drawing software draws the correct size according to the magnification of the image, so the overlaid image has the correct size of the grating profile.

Figure 4:
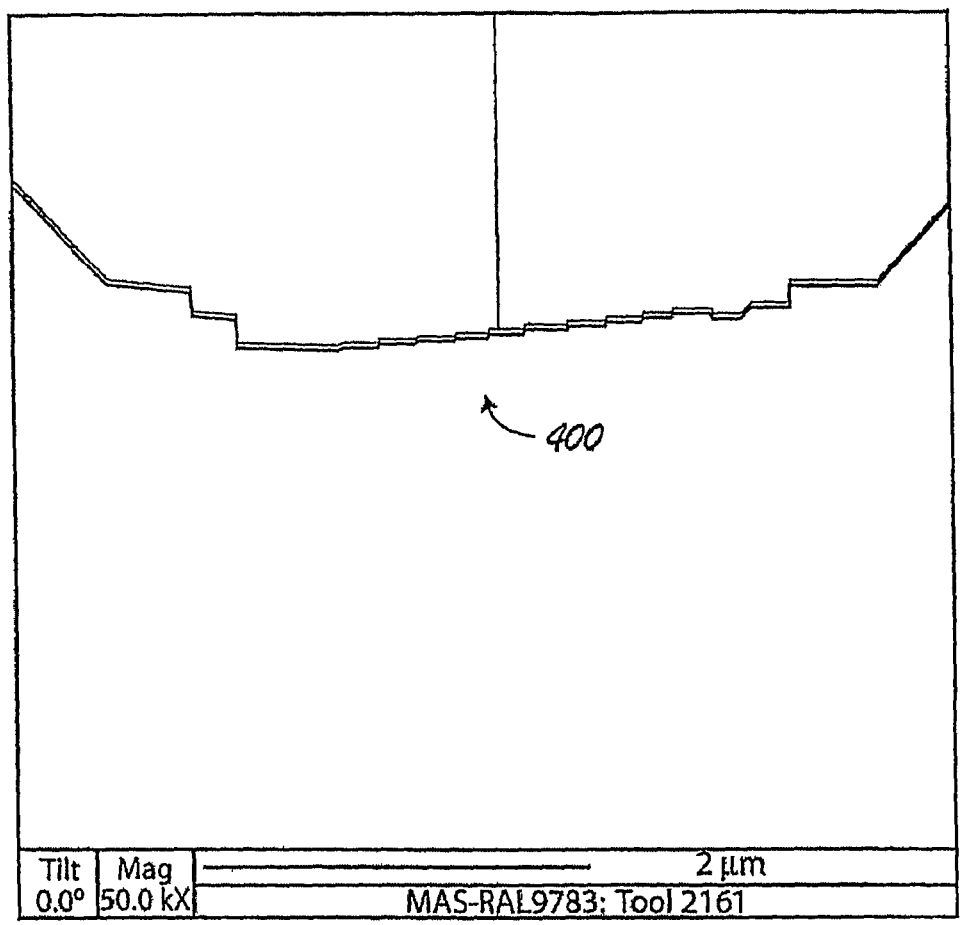
FIG. 4 is a view illustrating an end product structured diamond tool manufactured in accordance with the present invention as viewed in a view mode of an FIB machine at fifty-thousand times magnification, with a scale bar at 2 micrometers.

Machine the diamond tool with FIB along the overlaid profile. The ion beam strikes a bottom surface of the diamond tool at normal incidence as described above. Cut through to complete the diamond tool. The resulting structured diamond tool 400 is shown in FIG. 4.

Figure 5:
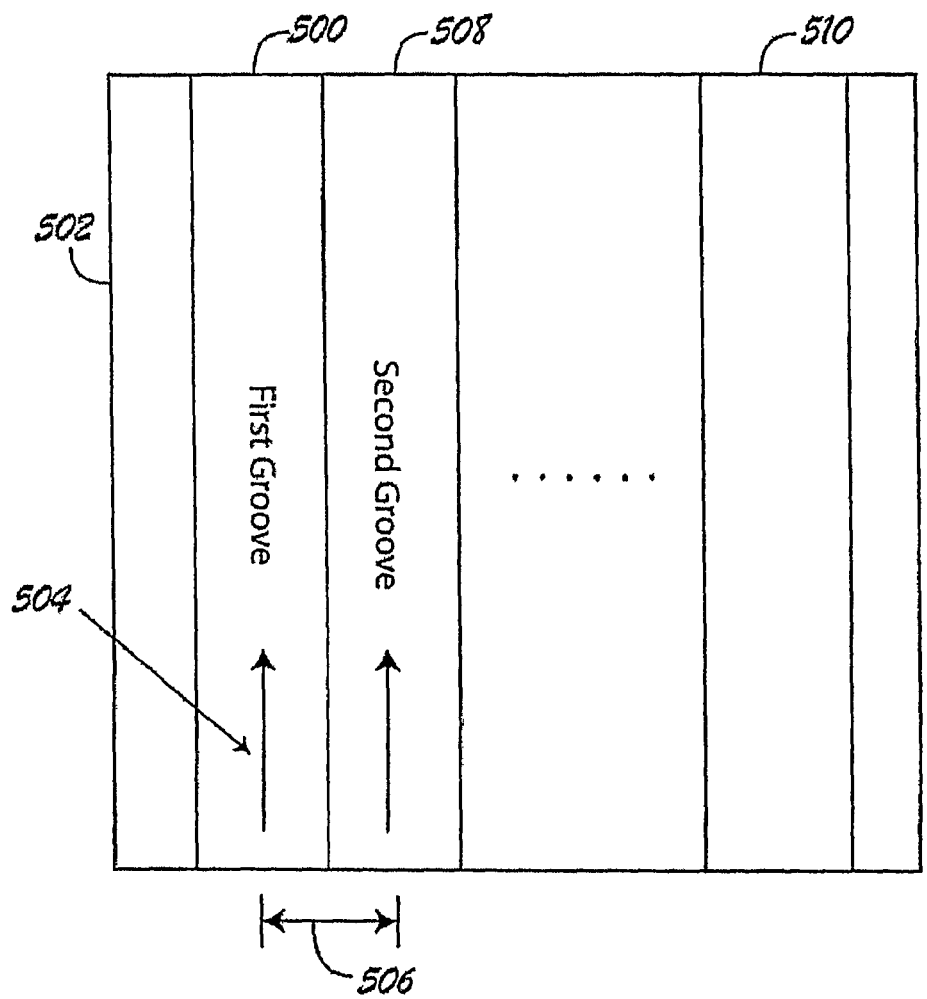
FIG. 5 is a top view illustrating a workpiece cut by repetitive application of the structured diamond tool to obtain straight grooves.
Figure 6:
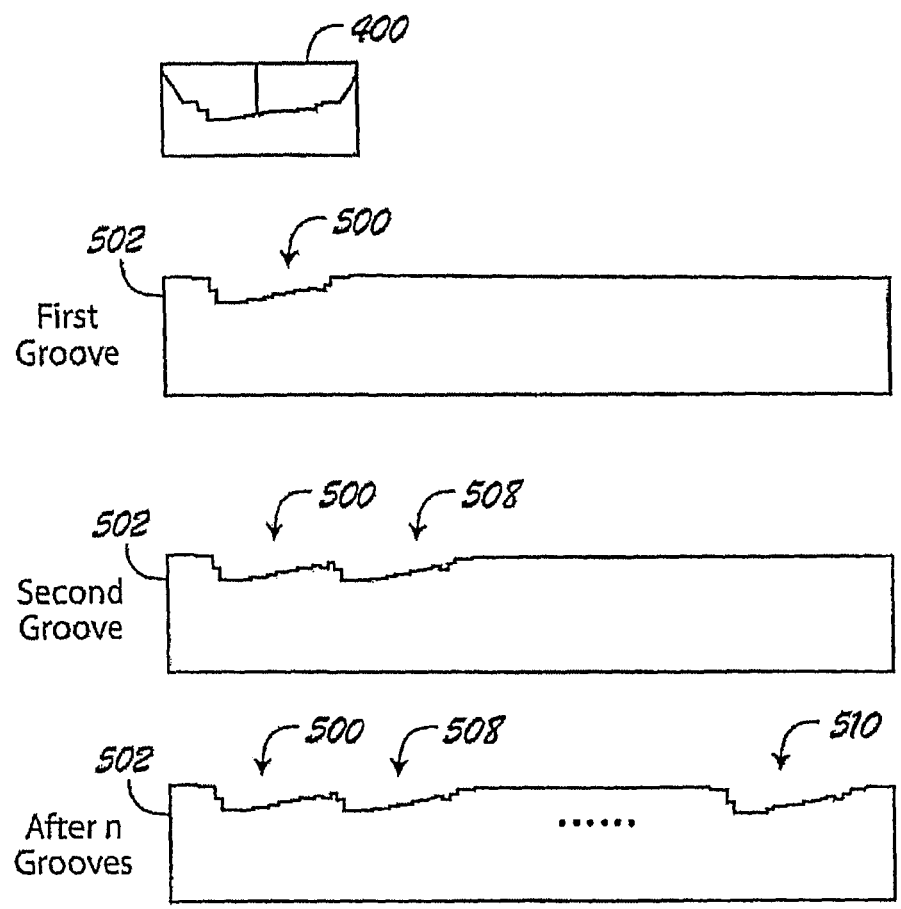
FIG. 6 is a side view illustrating a workpiece cut by repetitive application of the structured diamond tool.

The diamond machining of the grating grooves either for making the grating directly or making the mold is shown in FIG. 5 and FIG. 6. FIG. 5 is the top view of the work piece 502. FIG. 6 is a set of the cross section views of the work piece 502 showing the grayscale grating profile made in the work piece as it is machined by the structured diamond tool 400. A first groove 500 is made by cutting the work piece 502 with the diamond in the grooving direction 504. The diamond tool 400 is then stepped in a direction perpendicular to the grooving direction 504 according to a pitch between grooves 506. Then a second groove 508 is cut by the structured diamond tool. This process is repeated until a final groove 510 is cut. It should be noted that if the structured diamond tool has n periods of the grating profile, the step size 506 in the direction perpendicular to the grooves is n periods of the grating. The cut depth, as shown in FIG. 6, should be at least equal to or greater than the maximum height of the grating profile.

Figure 7:
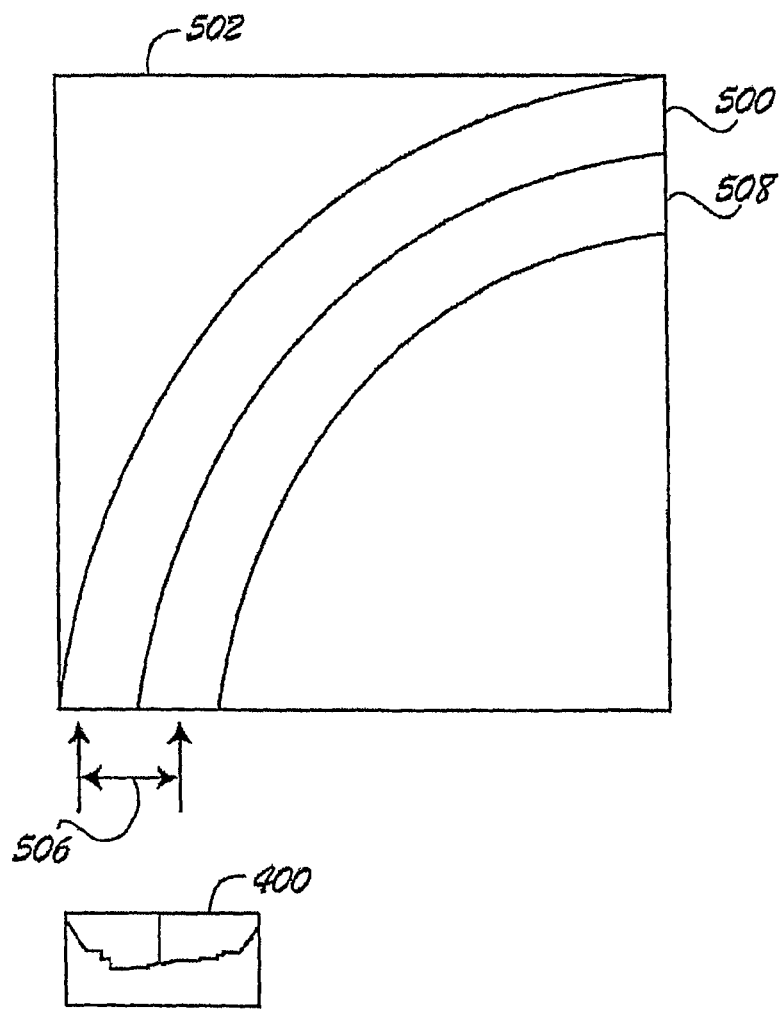
FIG. 7 is a top view illustrating a workpiece cut by repetitive application of the structured diamond tool to obtain curved grooves.

The description of the invention is merely exemplary in nature and, thus, variations that do not depart from the gist of the invention are intended to be within the scope of the invention. For example, FIG. 5 shows straight grating grooves, however, it is important to note that the grooves do not have to be straight. Turning now to FIG. 7, curved grating grooves can be made as well. In this case, the workpiece 502 and/or the structured diamond tool 400 can be rotated in order to keep the normal of a diamond tool rake face aligned with the tangents of curves 500 and 508. Such variations are not to be regarded as a departure from the spirit and scope of the invention.

What is claimed is:

1. A process of manufacturing a structured diamond tool for use in manufacture of grayscale gratings, the method comprising:
    placing a diamond tool in a focused ion beam (FIB) machine of the type having a display that provides a view mode;
    employing the FIB machine to display an image of the diamond tool in the display during view mode so that a tip of the diamond tool is visible in the display;
    defining an image plane corresponding to the plane of the view mode image in the display;
    calibrating a magnification of the displayed image to match the scale of the displayed image to the physical size of the diamond tool;
    employing FIB machine drawing software to overlay a displayed image of a grating profile line across at least a portion of the displayed image of the tip of the diamond tool, the displayed image of the grating profile line being substantially one-dimensional when viewed with respect to the image plane and exhibiting changes in linearity that correspond to changes in grating profile depth corresponding to at least one of: (a) a predefined grayscale grating profile; or (b) a negative of a predefined grayscale grating profile; and
    machining the diamond tool with FIB by using an ion beam to strike a surface of the diamond tool, the ion beam being directed normal to said image plane and being manipulated to follow the displayed image of the grating profile line.

2. The process of claim 1, further comprising cutting through the diamond tool to complete the structured diamond tool.

* * * * *